United States Patent
Takehara et al.

(10) Patent No.: US 7,921,547 B2
(45) Date of Patent: Apr. 12, 2011

(54) METHOD OF MAGNETIZING PERMANENT MAGNET FOR A MOTOR

(75) Inventors: Isamu Takehara, Chiba (JP); Shinji Kinoshita, Chiba (JP); Hiromitsu Gotoh, Chiba (JP)

(73) Assignee: Seiko Instruments Inc. (JP)

(*) Notice: Subject to any disclaimer, the term of this patent is extended or adjusted under 35 U.S.C. 154(b) by 686 days.

(21) Appl. No.: 11/978,800

(22) Filed: Oct. 30, 2007

(65) Prior Publication Data

US 2008/0061650 A1    Mar. 13, 2008

Related U.S. Application Data

(62) Division of application No. 10/525,886, filed as application No. PCT/JP2003/012455 on Sep. 29, 2003, now abandoned.

(30) Foreign Application Priority Data

Oct. 1, 2002    (JP) .................................. 2002-288228

(51) Int. Cl.
   *H01F 7/127*    (2006.01)
(52) U.S. Cl. .............................. 29/607; 29/596; 335/296
(58) Field of Classification Search .................... 29/607, 29/596, 598; 310/156.38, 156.44, 156.45, 310/156.35; 335/296
   See application file for complete search history.

(56) References Cited

U.S. PATENT DOCUMENTS

| | | | |
|---|---|---|---|
| 4,092,184 A | 5/1978 | Stucker | 148/103 |
| 4,547,758 A | 10/1985 | Shimizu et al. | 335/302 |
| 4,888,512 A | 12/1989 | Shimizu | 310/156 |
| 5,062,095 A | 10/1991 | Horikawa et al. | 369/44.21 |
| 5,642,009 A * | 6/1997 | McCleer et al. | 310/156.35 |
| 5,888,416 A * | 3/1999 | Ikuma et al. | 29/607 X |

FOREIGN PATENT DOCUMENTS

| | | |
|---|---|---|
| EP | 0198491 | 10/1986 |
| EP | 0801455 | 10/1997 |
| JP | 05114511 A * | 5/1993 |
| JP | 07332353 | 12/1995 |
| JP | 10269691 | 10/1998 |
| JP | 10288221 | 10/1998 |
| JP | 11103564 | 4/1999 |

OTHER PUBLICATIONS

English Language Translation of Japanese Publication, JP 5-114511.*

Kolletschke, Horst-Dieter: "Die Modulare Dauermagnetmaschine; Aufbau und Eigenschaten" Jun. 1, 1987, Universitat der Bundeswehr Munchen, Fakultat der Elektrotechnik, Munchen, XP002430316 pp. 78-84.

* cited by examiner

*Primary Examiner* — A. Dexter Tugbang
(74) *Attorney, Agent, or Firm* — Adams & Wilks

(57) ABSTRACT

In a method for magnetizing a permanent magnet for a motor, the permanent magnet has a thickness t in a radial direction of the permanent magnet satisfying the relation of $t \leq \pi D/(NM-\pi)$, where D represents an inner diameter of the permanent magnet having a value of 20 mm or less, N represents the number of the magnetic domains of the permanent magnet, and M represents the number of alternating current phases for driving the motor. In a first magnetizing step, the permanent magnet is magnetized in one direction corresponding to the radial direction. In a second magnetizing step, the permanent magnet magnetized in the first magnetizing step is magnetized to form inverse magnetic domains that are arranged at regular intervals in the radial direction and that reverse the magnetizing direction of the permanent magnet.

6 Claims, 14 Drawing Sheets

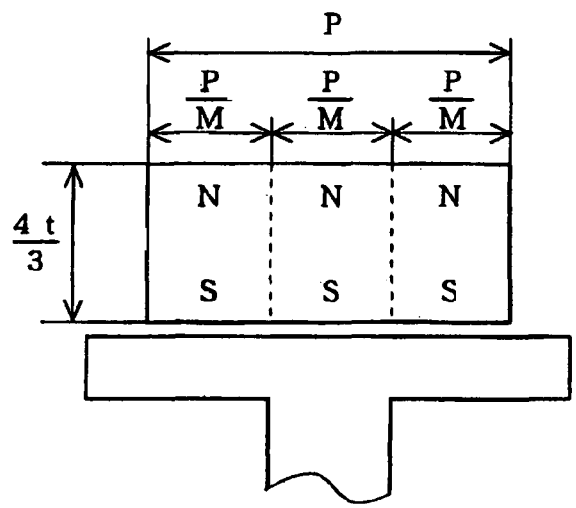
FIG.5A — Number of Phase M=3
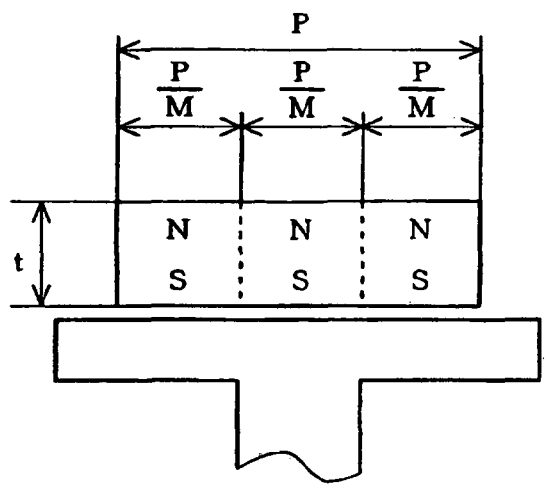
FIG.5B — Number of Phase M=3
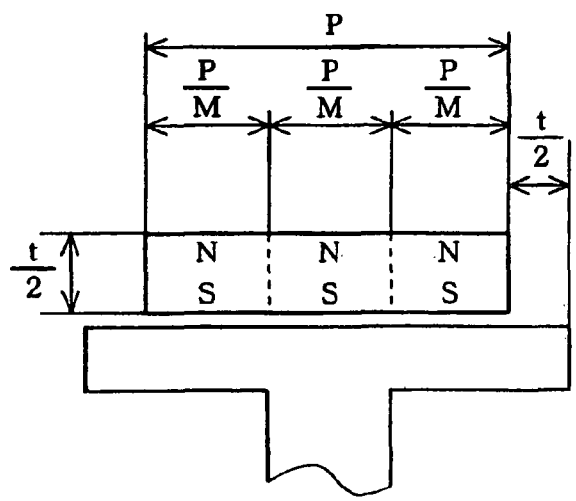
FIG.5C — Number of Phase M=3

| Number of Electrical Phase | 3 | Number of Poles of Rotor Magnet | 2 | 4 | 4 | 8 | 6 | 12 | 8 | 16 | 10 | 20 |
|---|---|---|---|---|---|---|---|---|---|---|---|---|
| | | Number of Slots of Stator | 3 | 3 | 6 | 6 | 9 | 9 | 12 | 12 | 15 | 15 |
| | 5 | Number of Poles of Rotor Magnet | – | 4 | 6 | 8 | 12 | 12 | 18 | 16 | 24 | – |
| | | Number of Slots of Stator | – | 5 | 5 | 10 | 10 | 15 | 15 | 20 | 20 | – |

FIG.6

METHOD OF MAGNETIZING PERMANENT MAGNET FOR A MOTOR

CROSS REFERENCE TO RELATED APPLICATION

The present application is a division of U.S. application Ser. No. 10/525,886, filed on Apr. 18, 2005 now abandoned, which was the National Stage of International Application No. PCT/JP2003/012455, filed Sep. 29, 2003, which are hereby incorporated by reference, and priority thereto for common subject matter is hereby claimed.

BACKGROUND OF THE INVENTION

1. Field of the Invention

The present invention relates to a permanent magnet which is compact and has a high performance, to a motor including a rotor provided with a the permanent magnet, and to a method for magnetizing the permanent magnet for the motor.

2. Background Information

In recent years, computers have been put in widespread use in a rapid pace. Disc-like storage media such as a hard disc and a magneto-optic disc are widely used for storage devices in most of those computers. Those storage media are rotated at a high speed by a small-sized motor provided to a disc drive and data is read or written from and to the media.

The motor used for the disc drive is designed to generate a rotating magnetic field by means of a stator coil so as to act on a permanent magnet provided to a rotor, thereby rotating.

The permanent magnet is magnetized radially (in a radial direction) and inverts polarities at a predetermined pitch along a circumferential direction. That is, the N pole and the S pole appear at regular intervals along an inner or outer circumference. The same polarity is attained in the same pitch; the number of domains where the same polarity appears is referred to as the number of poles.

At present, most widely used ones are motors that excite a stator coil and rotate a permanent magnet having 12 poles using three-phase AC. Regarding the permanent magnet size, the magnet having an outer diameter of about 25 (mm) has been dominantly used.

Those permanent magnets are magnetized by means of a large magnetic field generated by a magnetizing head installed to the inner or outer circumferential surface of the permanent magnet.

A lead wire is provided inside the magnetizing head, which allows a pulsed DC (several tens of thousands of amperes (A)) to flow therethrough.

As regards a permanent magnet for an outer rotor type motor, the magnetizing head is arranged at an inner circumferential portion of the permanent magnet to magnetize the magnet. This is because the outer rotor type motor has a stator coil that is arranged toward the inner circumferential surface of the permanent magnet, which requires high polarization property (definite border between the N pole and the S pole) of the inner circumferential surface of the permanent magnet. In short, the magnetizing head and the inner circumferential surface of the permanent magnet are arranged face to face. As a result, the polarization property of the inner circumferential surface of the permanent magnet is improved.

In contrast, in the case of using a permanent magnet for an inner rotor type motor, the stator coil is arranged to face the outer circumferential surface of the permanent magnet, so the magnetizing head is provided at an outer circumferential portion of the permanent magnet to magnetize the magnet.

Most of those permanent magnets are rare earth magnets. Of the rare earth magnets, a bonded magnet formed of an Nd—Fe—B based material as an isotropic magnetic material has been used in a great many cases.

The term isotropic means that the directions of magnetic force of the magnetic material extend not in the same direction but randomly. Magnetizing the material yields a magnet.

Also, the term bonded magnet means a magnet obtained by mixing a resin with a magnetic material for facilitating molding of the magnetic material.

In addition, in recent years, as disclosed in JP 2000-195714 A, an Sm—Fe—N bonded magnet has come into use.

Then, various attempts have been taken to realize a multi-polar magnet making use of anisotropic property of the Sm—Fe—N bonded magnet or to prepare an Sm—Fe—N bonded magnet resistant to rust; an Nd—Fe—B bonded magnets is inferior in resistance to rust.

Here, the term anisotropic means that the magnetic force in the constituents of the magnetic material is generated in the same direction. A magnet with a high magnetic force, as compared with the one obtained by magnetizing the isotropic magnetic material, can be obtained by previously aligning the directions of the magnetic force and then magnetizing the material.

A hard disc has been recently used also in other fields than a computer field, for example, a digital camera, car navigation system, or information appliance. Along with this tendency, a small-sized motor for driving a memory disc of a storage device with a size of typical 2.5 inches or smaller has been growing in the market.

In response to the recent application of the small-sized hard disk top rotatable devices such as the digital camera or information appliances, there are demands for a downsized, energy-saving motor that realizes a high torque.

Downsizing the motor leads to reduction in size of the permanent magnet used therefor. Then, downsizing the permanent magnet necessitates reduction in size of a magnetizing head for magnetizing the permanent magnet.

When the magnetizing head is downsized, a lead wire used therefor is thinned. A direct current supplied to the magnetizing head is reduced, in part, because of the withstand voltage of the magnetizing head. As a result, there is a problems that full magnetization (magnetic saturation) for the permanent magnet is not always allowed and the ability inherent in the magnetic material cannot be completely brought out.

It is therefore an object of the present invention to provide a permanent magnet which is compact and has a high performance, a motor equipped with the permanent magnet, and a method for magnetizing the permanent magnet.

SUMMARY OF THE INVENTION

The present invention provides, in order to attain the above-mentioned object, a permanent magnet for a motor, which is disposed in a rotor for the motor and has a cylindrical shape, including domains that are magnetized in a radial direction and are arranged at regular intervals in a circumferential direction, characterized in that provided that D represents an inner diameter of the permanent magnet, t represents a thickness in the radial direction, N represents the number of domains, and M represents the number of AC phases for driving the motor, D is set to 20 (mm) or smaller and t is set to satisfy the relation of $t \leq \pi D/(NM-\pi)$.

Also, the permanent magnet for the motor of the present invention is characterized in that the permanent magnet is formed of an Sm—Co based magnetic material.

Also, the present invention provides a motor including: a rotor portion including a rotational symmetrical body around which a cylindrical permanent magnet is arranged, and a rotational shaft arranged on an axial line of the rotational symmetrical body; a stator portion having a plurality of stator coils excitable with AC having M phases, which are each arranged on an inner circumference or outer circumference of the permanent magnet to face the permanent magnet; and a bearing portion rotatably and pivotally supporting the rotational shaft to the stator portion so that the rotational symmetric body and the stator coil are concentric to each other, characterized in that: the permanent magnet includes domains that are magnetized in a radial direction and are arranged at regular intervals in a circumferential direction; and provided that D represents an inner diameter of the permanent magnet, t represents a thickness in the radial direction, N represents the number of domains, and M represents the number of AC phases for driving the motor, D is set to 20 (mm) or smaller and t is set to satisfy the relation of $t \leqq \pi D/(NM-\pi)$.

Also, the motor of the present invention is characterized in that the permanent magnet is formed of an Sm—Co based magnetic material.

Further, in order to attain the above-mentioned object, the present invention provides a magnetizing method for magnetizing a cylindrical permanent magnet disposed to a rotor for the motor so that domains that are magnetized in a radial direction are arranged at regular intervals in a circumferential direction, the permanent magnet being configured so that, provided that D represents an inner diameter of the permanent magnet, t represents a thickness in the radial direction, N represents the number of poles, and M represents the number of AC phases for driving the motor, D is set to 20 (mm) or smaller and t is set to satisfy the relation of $t \leqq \pi D/(NM-\pi)$, the method being characterized by including: a one-direction magnetization step of magnetizing the permanent magnet in one direction which is the radial direction; and a pole magnetization step of magnetizing the permanent magnet magnetized in the one direction in the one-direction magnetization step to domains that inverse the magnetizing direction at regular intervals in the radial direction.

Also, the magnetizing method of the present invention is characterized in that the permanent magnet is formed of an Sm-Co based magnetic material.

BRIEF DESCRIPTION OF THE DRAWINGS

FIGS. 5A-5C are schematic diagrams showing a stator core and a permanent magnet as viewed from the axial direction.

FIG. 6 is a table listing combination examples of the number of permanent magnets, the number of slots, and the number of AC phases.

DETAILED DESCRIPTION OF THE PREFERRED EMBODIMENT

Hereinafter, a preferred embodiment of the present invention will be described in detail.

(1) Outline of Embodiment

If a motor is downsized, a permanent magnet (having a cylindrical shape and provided to a rotor) used therefor is reduced in size. This requires a compact magnetizing head for magnetizing the permanent magnet and makes is difficult to allow current to flow in large amounts at the time of magnetization. As a result of suppressing current to be supplied to the magnetizing head (hereinafter, referred to as magnetizing current) at the time of magnetization, the permanent magnet is hardly magnetized to its limit of the magnetizing force (full magnetization). Thus, it is difficult to bring out an ability of the magnetic material fully.

Among others, in the case of using an outer rotor type motor, a magnetizing head for allowing magnetizing current to flow should be arranged inside a cylindrical magnetic material in order to magnetize the magnetic material from inside the same. In addition, a multipolar permanent magnet has been under study. Hence, there arises a need to wind thick lead wire with more wire turns inside the magnetizing head. As a result, the smaller the size, the thinner the lead wire and the smaller the interval between the lead wires. Thus, severer limitations are imposed on the magnetizing current.

In light of the above, according to this embodiment, the thickness of the permanent magnet is made smaller in a radial direction so as to enable full magnetization of the unmagnetized permanent magnet even with a small magnetizing current.

Also, in general, when the thickness of the permanent magnet is made thin, the magnet is easily demagnetized due to the magnetic field from the outside. In order to suppress this, an Sm—Co (samarium-cobalt) magnetic material that can generate a magnetic flux in large amounts even with the small thickness in the radial direction and has a large coercive force is adopted. The Sm—Co magnetic material has an advantage that demagnetization due to machining (phenomenon that the magnetic force weakens due to the force applied from the outside, such as force applied in machining) or demagnetization due to high temperature (demagnetization resulting form the high temperature) hardly occurs.

Further, some of the Sm—Co magnetic materials have the anisotropic property. Thus, there is another advantage that the magnetization is effected after the magnetic axes of the overall magnetic material are made coaxial through the magnetic field orientation, making it possible to generate the magnetic flux in large amounts even with the small thickness.

Besides, the Sm—Co magnetic material has not been yet widely used as the permanent magnet for a motor on account of costing high, despite its high magnetic characteristics. In this embodiment, because of the small-sized motor, the requisite amount of the magnetic material to be used is small and thus, the use of the Sm—Co magnetic material overcomes the problem about the cost.

(2) Details of Embodiment Hereinafter, the preferred embodiment of the present invention will be described in detail.

Figure 1:
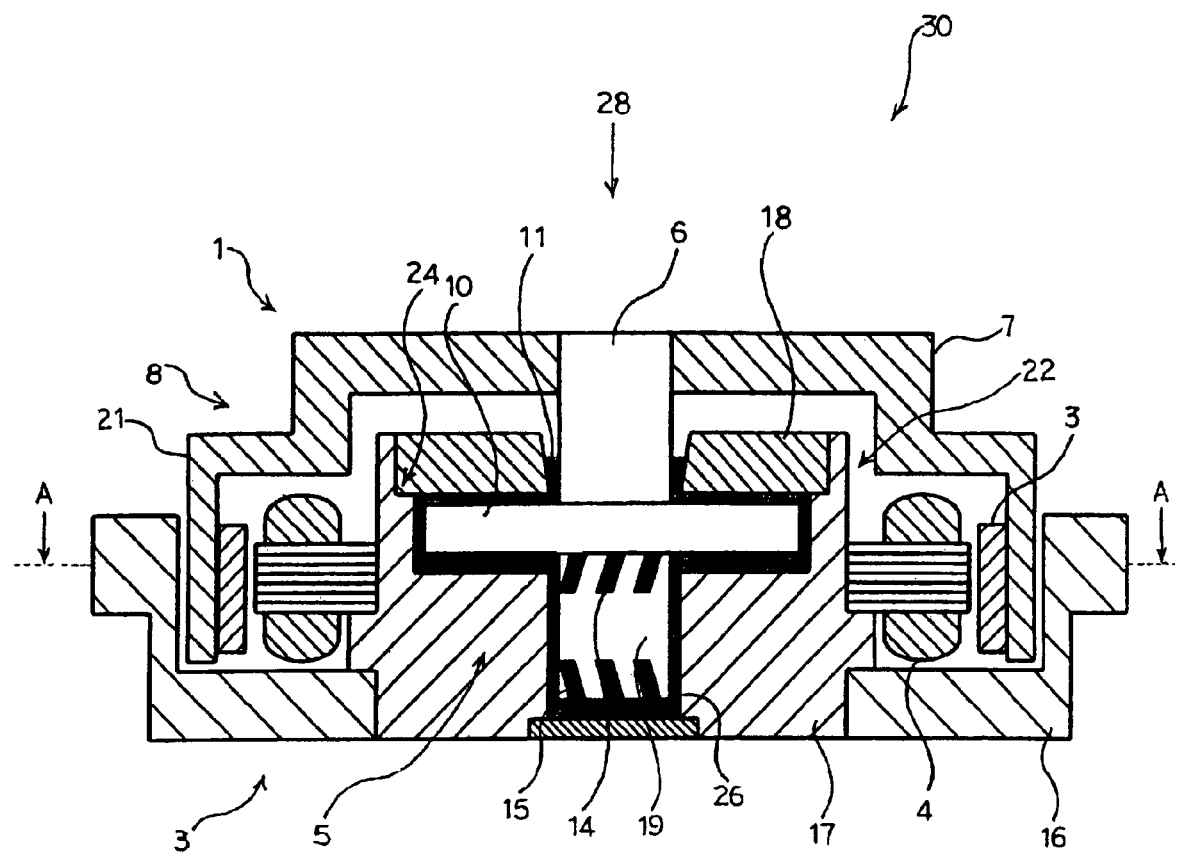
FIG. 1 is a sectional view taken along the axial direction, of a motor according to an embodiment of the present invention.

FIG. 1 is a sectional view taken along the axial direction, which shows a motor according to this embodiment.

A motor 30 is a micro dynamic motor of an outer rotor type used for, for example, a hard disc drive or a magneto-optic disc drive. The motor 30 is a DC brushless motor driven by using three-phase AC.

Also, the motor 30 is a micro motor having the outer diameter of about 25 (mm) and the thickness of about 5 (mm) at maximum.

The motor 30 is composed of a rotor portion 1, a stator portion 2 for supporting the rotor portion 1, and the like.

The stator portion 2 is provided with a cavity charged with an oil 11. Then, a part provided with a dynamic pressure generating mechanism of the rotor portion 1 (rotational shaft flange 10 and other end portion 19) are housed in the cavity to constitute a dynamic bearing portion 5.

With the operation of the dynamic bearing portion 5, the rotor portion 1 is pivotally supported to the stator portion 2 at the time of rotation.

The rotor portion 1 is composed of the rotational shaft 6, the rotor 7, and the like.

The rotor portion 7 takes a convex disc-like shape having a step 8. The cylindrical rotor frame 21 is formed at the outer circumferential portion of the rotor 7.

A U-shaped space is defined inside the rotor 7, for housing the dynamic bearing portion 5 and the stator coil 4.

Further, a through-hole in which the rotational shaft 6 is fitted is formed in the rotational shaft direction at a central portion in the radial direction.

The step 8 is subjected to positioning so as to fit into an attachment hold formed in the center of the disc-like storage medium such as the hard disc, and fixed thereto.

In this way, the rotor portion and the hard disc can be integrally rotated.

A permanent magnet 3 of 12 poles formed in the cylindrical shape is concentrically attached to the inner circumferential surface of the rotor frame 21. A rotational magnetic field generated by the stator coil 4 arranged at the stator portion 2 gives the rotor 7 a torque.

An upper end portion of the rotational shaft 6 is inserted into the through-hole of the rotor 7. The rotational shaft flange 10 for generating a dynamic pressure in a thrust direction is provided on the entire circumference, around the central portion in the axial direction of the rotational shaft 6.

Regarding the rotational shaft flange 10 and the rotational shaft 6, a through-hole may be formed at the center in the radial direction of the rotational shaft flange 10, and the rotational shaft 6 may be inserted into the through-hole and fixed thereto. Alternatively, the rotational shaft 6 and the rotational shaft flange 10 may be integrally processed.

Formed at one end of the rotational shaft 6 (not attached with the rotor 7) is an other-end portion 19 for producing the dynamic pressure in the radial direction.

The other end portion 19 may be formed by inserting the rotational shaft 6 into the rotational shaft flange 10 or formed separately on a lower end surface of the rotational shaft flange 10.

Also, the rotational flange 10, the rotational shaft 6, and the other end portion 19 may be integrally processed.

Note that the rotational flange 10 may take various shapes in section when in use, such as a rhombus shape and trapezoidal shape.

The stator portion 2 is composed of a stator frame 16, a base 17, an upper plate 18, the stator coil 4, and the like.

The upper plate 18 is a disc-like member having a through-hole for loosely inserting the rotational shaft 6 at the center in the radial direction.

The end surface in contact with the oil 11 of the upper plate 18 constitutes an opposing surface receiving the dynamic pressure generated by the rotational shaft flange 10.

The through-hole formed at the center in the radial direction of the upper plate 18 is formed into a taper shape so as to decrease the diameter toward the reservoir for the oil 11 and constitutes a capillary seal for preventing leakage of the oil 11.

In, this way, by forming the through-hole so as to decrease its diameter toward the reservoir for the oil 11, the through-hole and the rotational shaft 6 serve to prevent the oil leakage by means of capillary phenomenon acting on the oil 11 and its surface tension.

The base 17 has a loose-insertion hole 26 for housing the other end portion 19, a sleeve 22 forming the cylindrical surface facing the outer circumferential surface of the rotational shaft flange 10, and a step 24 that is formed at the upper end of the sleeve 22 and fitted to the upper plate 18, which are integrally formed.

These loose-insertion hole 26, the sleeve 22, and the step 24 are formed concentrically.

An inner diameter of the loose-insertion hole 26 is set larger than an outer diameter of the other end portion 19. When the other end portion 19 is inserted into the loose-insertion hole 26, an appropriate gap is secured such that the dynamic pressure is produced, with the oil 11.

Also, an appropriate space is defined between the lower end of the other end portion 19 and the bottom of the loose-insertion hole 26 and serves as an oil reservoir for the oil 11.

An inner diameter of the sleeve 22 is set larger than the outer diameter of the rotational shaft flange 10. A space between the outer circumferential surface of the rotational shaft flange 10 and the inner circumferential surface of the sleeve 22 is used as the oil reservoir.

An inner diameter of the step 24 is set to such a value that enables the upper plate 18 to be fitted with a predetermined fit tolerance. The upper plate 18 is fitted to the step 24 and thus undergoes the positioning. The through-hole formed in the upper plate 18, the loose-insertion hole 26, the sleeve 22, and the step 24 are coaxial with one another on the axial line.

The stator frame 16 is formed around the base 17. The stator frame 16 is a U-shaped member having formed therein an insertion hole for inserting the base 17 at the center in the radial direction. The stator frame 16 is used to fix the motor 30 to the casing of the hard disc drive by screwing or other such means.

The stator frame 16 has the plural stator coils 4 concentrically arranged at regular intervals.

A gap is secured between the stator coil 4 and the permanent magnet 3. At the time of rotating the rotor portion 1, the stator coil 4 and the permanent magnet 3 are not brought into contact with each other.

Figure 2:
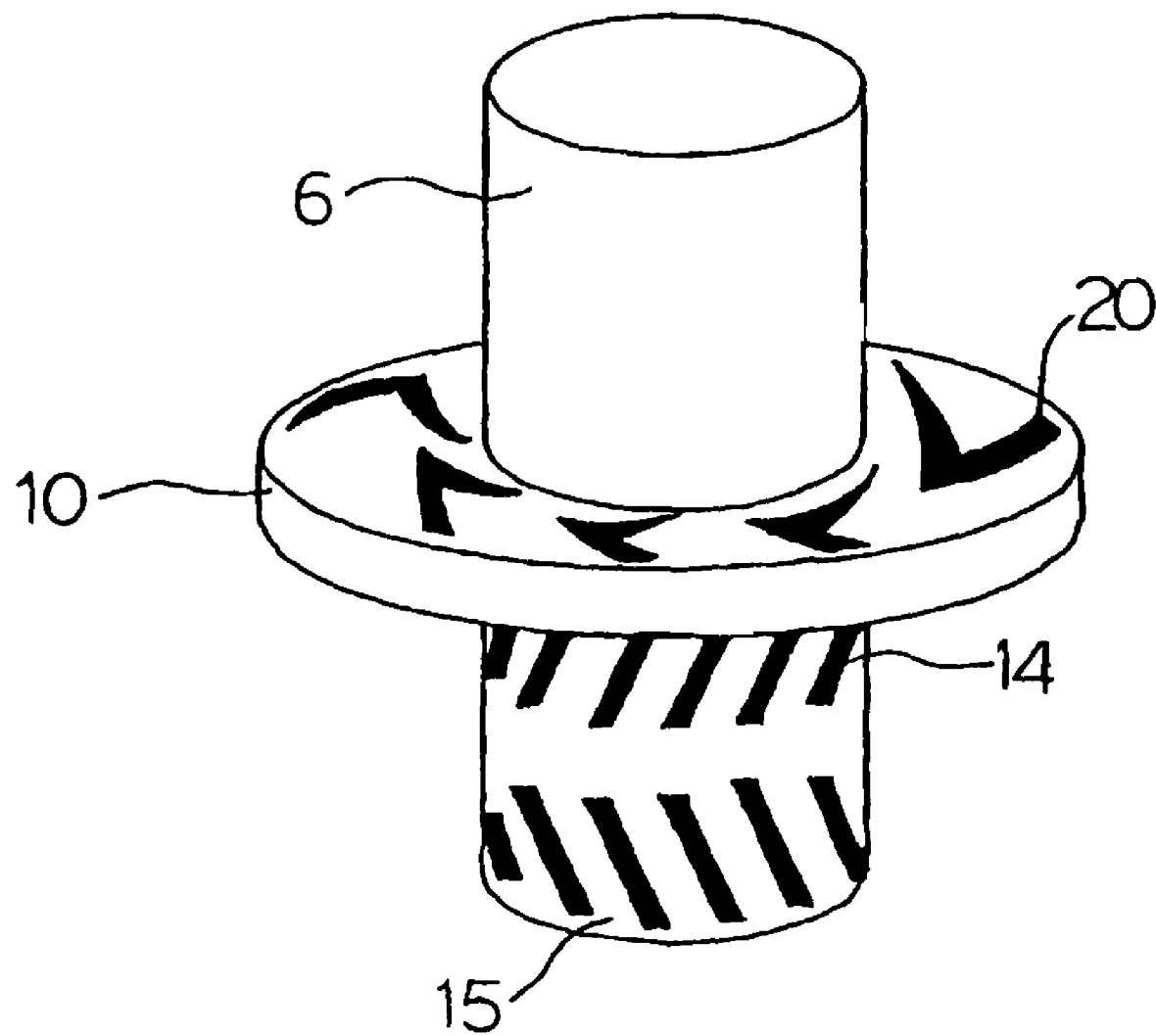
FIG. 2 shows a dynamic pressure generating groove formed in a rotational shaft flange or other end portion.

FIG. 2 shows a dynamic pressure generating groove formed in the rotational shaft flange 10 and the other end portion 19.

A dynamic pressure generation groove 20 (for example, herring bone groove) for generating the dynamic pressure in the thrust direction is formed at the upper end surface of the rotational shaft flange 10.

Although not shown, the dynamic pressure generating groove 20 is formed in the lower end surface of the rotational shaft flange 10 as well.

When the rotational shaft flange 10 is rotated, the dynamic pressure is applied to both end surfaces of the rotational shaft flange 10 in the thrust direction by means of a pumping action of the dynamic pressure generation grooves 20.

Then, the generated dynamic pressure produces a pressure in the thrust direction between both the end surfaces of the rotational shaft flange 10 and the surface on the stator side, which faces the surfaces through the oil 11. The pressures applied to both the end surfaces are balanced, whereby the rotational shaft 6 is supported in the thrust direction. In this way, the other end portion 19 constitutes thrust-direction dynamic pressure generating means.

Dynamic pressure generation grooves 14 and 15 (upper and lower oblique grooves tilted in different directions with respect to the axial direction) are formed in the circumferential surface of the other end portion 19, for generating a dynamic pressure in a radial direction.

When the rotational shaft 6 pivots, the dynamic pressure is generated about the other end portion 19 by means of the pumping action of the dynamic pressure generating grooves 14 and 15.

The generated dynamic pressure yields a pressure in the radial direction between the circumferential surface of the other end portion 19 and the inner circumferential surface of the loose-insertion hole 26 opposite thereto through the oil 11. Then, the pressures applied to the circumferential portion 19 are balanced, whereby the rotational shaft 6 is supported in the radial direction. In this way, the other end portion 19 serves as radial-direction pressure generation means.

The rotor portion 1 can be rotatably and pivotally supported about the rotational shaft by the dynamic pressure in the thrust direction generated in the rotational shaft flange 10 and the dynamic pressure in the radial direction generated in the other end portion 19 as mentioned above.

Note that the rotational shaft 6 pivots counterclockwise as viewed from a direction of an arrow 28 of the motor 30 (FIG. 1).

Figure 3:
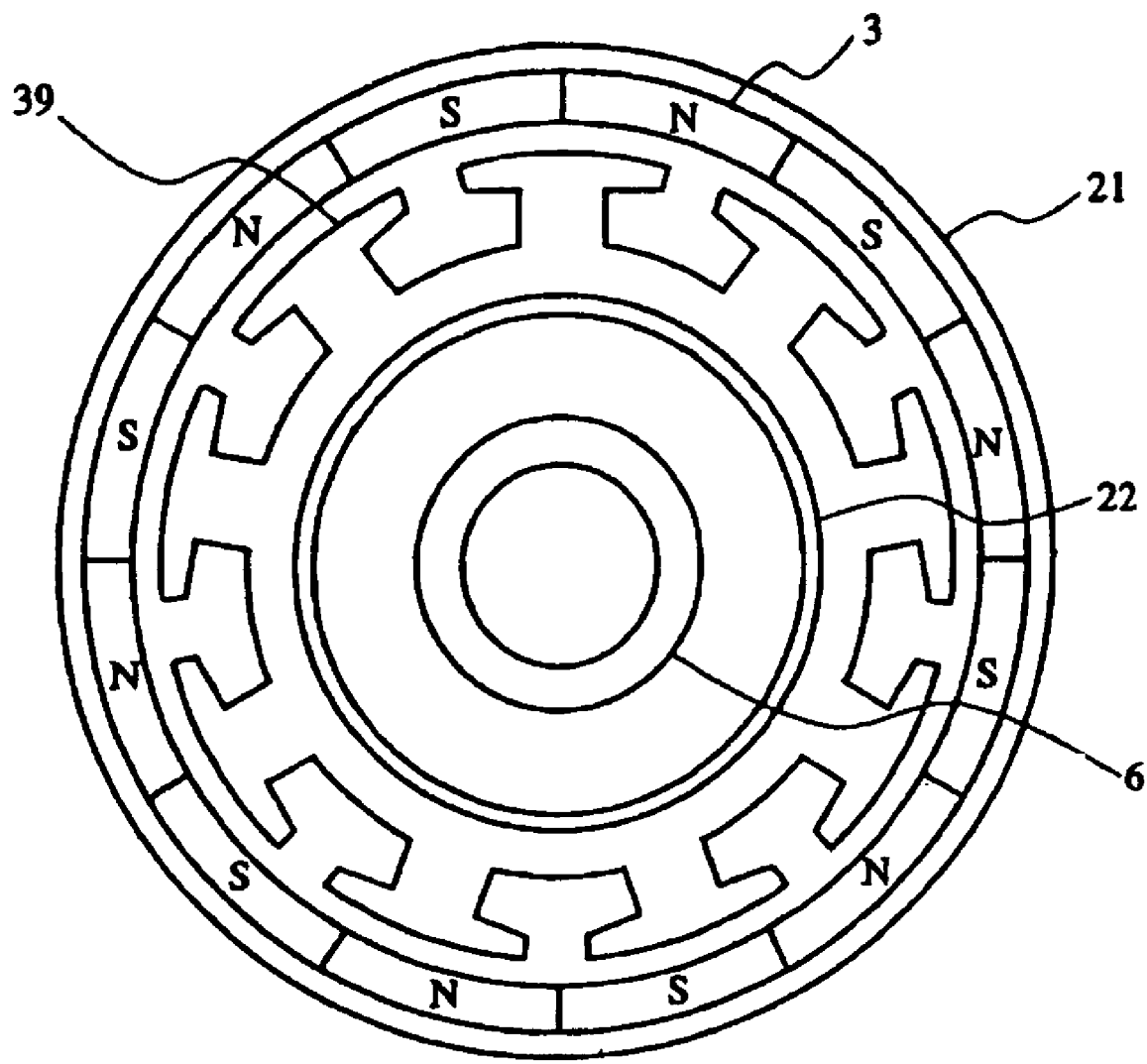
FIG. 3 schematically shows a section taken along the line 3-3 in FIG. 1.

FIG. 3 schematically shows a section of the motor 30 taken along the line 3-3 (FIG. 1).

The motor 30 is a DC brushless motor with the 12 poles and 9 slots.

As shown in the figure, the motor 30 has the sleeve 22 formed concentrically with the rotational shaft 6, and the stator core 39 is arranged around the sleeve 22.

The permanent magnet 3 is formed concentrically with the rotational shaft 6 at a given gap from the stator core 39. The outer circumferential surface of the permanent magnet 3 is bonded to the inner circumferential surface of the rotor frame 21.

The rotational shaft 6, the permanent magnet 3, and the rotor frame 21 can be integrally rotated about the stator core 39.

The 9 stator cores 39 are formed so as to radially protrude from the sleeve 22. A slot is formed between the adjacent stator cores 39. A winding for excitation (not shown) is wound around the stator core 39. The three-phase AC is supplied thereto and the rotational magnetic field is generated at the inner circumferential portion of the permanent magnet 3.

The permanent magnet 3 and 12 divided magnetic domains in the circumferential direction. Each domain is, as described below, magnetized in the radial direction from the stator core 39 side to the rotor frame 21 side or from the rotor frame 21 side to the stator core 39 side. The 12 domains constitute the permanent magnet having 12 poles.

In the figure, denoted by N and S are magnetic poles appearing in the inner circumferential surface of the permanent magnet 3 in each domain.

As shown in the figure, the N pole and the S pole alternately appear in the circumferential direction on the inner circumferential surface of the permanent magnet 3.

The rotational magnetic field generated by the stator core 39, and the magnetic poles formed in the permanent magnet 3 interact with each other to cause the permanent magnet 3 to generate a torque about the rotational shaft 6.

The positions of the magnetic poles of the permanent magnet 3 are detected to appropriately control the current caused to flow in the stator cores 39, making it possible to cause the permanent magnet 3 to generate a torque.

Next, a shape and magnetic material of the permanent magnet 3 are described.

Figure 4A:
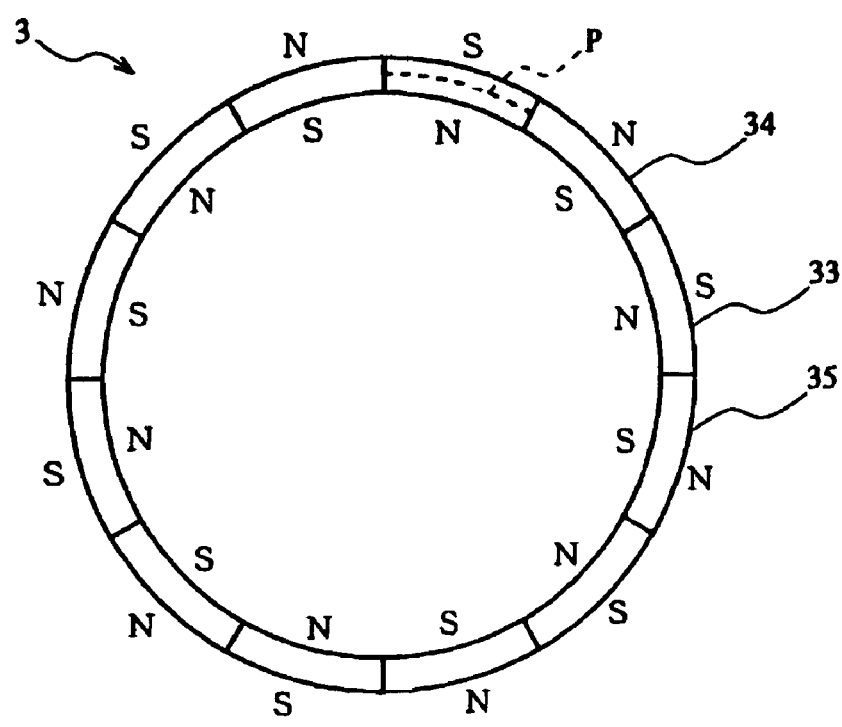
FIGS. 4A-4B show an outer shape and magnetic poles of a permanent magnet.
Figure 4B:
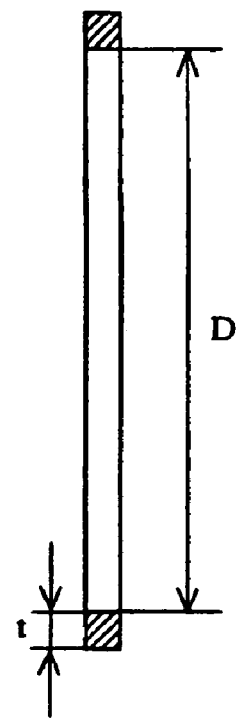

FIG. 4 shows an outer shape and magnetic pole of the permanent magnet 3. FIG. 4($a$) shows the permanent magnet 3 as viewed from the rotational shaft direction (arrow 28 of FIG. 1). FIG. 4($b$) shows the permanent magnet 3 as viewed from the direction vertical to the direction of the arrow 28.

The permanent magnet 3 has a ring shape. The permanent magnet 3 has 12 poles and the permanent magnet 3 has 12 divided magnetic domains in the circumferential direction. The respective domains are magnetized in the direction from the inner circumferential side to the outer circumferential side or from the outer circumferential side to the inner circumferential side. The adjacent domains are inverse to each other in the magnetizing direction.

Assuming that the permanent magnet 3 has 16 poles, the permanent magnet 3 is divided into 16 domains in the circumferential direction to thereby form 16 magnetic domains. It is assumed, more commonly, that N poles are employed, the permanent magnet 3 is divided into N domains in the circumferential direction and the respective domains are magnetized in the radial direction such that the adjacent domains are inverse to each other in the magnetizing direction.

For example, in a domain 33, the inner circumferential side is magnetized to serve as the N pole, while the outer circumferential side is magnetized to serve as the S pole. Meanwhile, in domains 34 and 35 adjacent to the domain 33, the inner circumferential side is magnetized to serve as the S pole, while the outer circumferential side is magnetized to serve as the N pole.

Therefore, the N pole and the S pole alternately appear along the inner circumferential surface. Similarly, the N pole and the S pole alternately appear along the outer circumferential surface.

Next, a relationship between an inner diameter D of the permanent magnet 3 and a thickness t will be described.

As shown in FIG. 4($a$), a magnetic pole pitch is represented by P (mm), and as shown in FIG. 4($b$), the inner diameter of the permanent magnet 3 is represented by D (mm) ($\leq 20$ (mm)), the thickness in the radial direction of the circular portion is represented by t (mm), and the number of poles is represented by N.

Note that the magnetic pole pitch P is set to, with the provision that a circle is drawn so as to pass through a middle point between the inner circumferential surface and the outer circumferential surface of the permanent magnet 3 in the radial direction, a length included in each domain of the drawn circle.

Note that when an outer diameter of the permanent magnet 3 is 20 (mm), the inner diameter D is smaller than 20 (mm).

Then, the following expression (1) is established based on the geometric form of the permanent magnet 3:

[Numerical Expression 1]

$$NP = \pi(D+t) \tag{1}$$

In the case of designing the permanent magnet for a motor, a ratio between the thickness t and the pitch P is set so as to substantially correspond to the number of alternating current (AC) phases, so that a satisfactory motor is obtained, which has less magnetic flux leakage and high performance. Provided that M represents the number of AC phases for driving the motor, the empiric formula corresponds to the following expression (2):

[Numerical Expression 2]

$$P/t = M \tag{2}$$

Removing P from the above expressions (1) and (2) results in the following relational expression (3):

[Numerical Expression 3]

$$t \leq \pi D/(NM-\pi) \tag{3}$$

In the expression, t has only to be not larger than a value derived from the right side of the expression (3), which is represented by the inequality sign in the expression (3).

Also, variations in design of values in the expression (2) are allowed within a tolerance of ±15% or less. The range of t in the case of allowing the variations in M within the tolerance of 15% or less is represented by the following expression (4):

[Numerical Expression 4]

$$\pi D/(1.15 \times NM-\pi) \leq t \leq \pi D/(0.85 \times NM-\pi) \tag{4}$$

Further, in the case where the number of poles is 12 and the number of slots is 9, the upper limit and lower limit of P/t can be defined as represented by the following expression (5):

[Numerical Expression 5]

$$0.75 \times M \leq P/t \leq 2 \times M \tag{5}$$

Here, a process of deriving the expression (5) will be described.

FIG. 5 is a schematic diagram showing the stator core 39 and the permanent magnet 3 as viewed in the axial direction. Note that FIG. 5 shows a case in which the number of AC phases is 3 (M=3) by way of example. This can be extended to the other number of phases, for example, 5 (M=5).

Of those, FIG. 5(*a*) is a schematic diagram illustrative of an upper limit of the thickness of the permanent magnet.

Considering the magnetic flux leakage between the magnetic pole of the permanent magnet 3 and the stator core 39, the thickness limit of the permanent magnet may correspond to a ratio between an area for one pole and an area of one iron core tooth facing the pole across a gap (saturation limit in magnetic flux concentration of the permanent magnet). The area ratio is represented by the following: (πD/12 poles)/(πD/9 slots)=0.75. This value is given as the lower limit of P/t.

FIG. 5(*b*) is a schematic diagram illustrative of a design center value of the permanent magnet 3.

Regarding the design center value, t=P/M is preferred. Switching the phase is effected three times per magnetic pole. Taking into account the magnetic flux leakage, it is nearly preferable to meet t:P/M=1:1.

FIG. 5(*c*) is a schematic diagram illustrative of the lower limit of the thickness of the permanent magnet 3.

Considering the limit that does not reduce the torque so much, the lower limit of the thickness is set such that the thickness of the permanent magnet 3 is substantially equal to the length of one of both ends of the iron core tooth of the stator core 39 protruding from each pole of the permanent magnet 3 (magnetic flux dispersion limit). It is preferable that the length in the outer circumferential direction of the stator core be set larger than the length of one pole of the permanent magnet by t/2 each. In this case, substantially, P/t=2M. This is given as the upper limit of P/t.

Deriving the range of t from the expression (5) thus obtained results in the following expression (6):

[Numerical Expression 6]

$$\pi D/(2 \times NM-\pi) \leq t \leq \pi D/(0.75 \times NM-\pi) \tag{6}$$

As will be described below, downsizing the permanent magnet 3 leads to reduction in the magnetizing head for magnetizing the permanent magnet. Then, this necessities reduction in thickness and wire turns of the lead wire used therefor. Thus, it is difficult to increase an ampere-turn for the magnetization, with the result that the magnetizing current is limited. In particular, in a region where the inner diameter of the permanent magnet 3 is 20 (mm) or less, severe limitations are imposed on the magnetizing current. In a region where the outer diameter is 20 (mm), the inner diameter is 20 (mm) or smaller, so more severe limitations are imposed.

Also, with Nd—Fe—B as a conventional magnetic material, the thickness t of the permanent magnet in the radial direction is set larger than the thickness defined by the above expression (2) in order to obtain larger magnetic force after the magnetization or to maintain the magnetic force after the magnetization. When the thickness of the permanent magnet is increased, the larger magnetic force, i.e., magnetizing current is necessary upon the magnetization.

For these reasons, conventional compact permanent magnets (in particular, with inner diameter of 20 (mm) or smaller) cannot full-magnetize its magnetic material even if magnetized using a maximum possible current supplied to the magnetizing head. This means that the magnetic ability of the magnetic material is not completely brought out.

In other words, the ability of the magnetizing head imposes a limitation on the ability of the permanent magnet.

To that end, in this embodiment, the permanent magnet 3 is made thin enough to allow the full magnetization with the magnetizing current limited by the ability of the magnetizing head, in the radial direction.

Also, there is a possibility that the reduction in thickness of the permanent magnet 3 leads to the magnetic force of the permanent magnet 3, which is weaker than before or the ability to keep the magnetic force reduces, but this embodiment overcomes this problem by using an Sm—Co magnetic material as the magnetic material.

Some of the Sm—Co magnetic materials exhibit anisotropic property unlike any conventional isotropic Nd—Fe—B magnetic material. The use of the anisotropic material can yield, as described below, a sufficient magnetic force even with the small thickness, through magnetic field orientation.

Further, the Sm—Co magnet has a constant magnetic moment due to a pinning mechanism of the magnetic moment, and thus is known to involve less machining demagnetization and high-temperature demagnetization than the Nd—Fe—B magnet having no pinning mechanism.

This is because the Sm—Co magnet has a magnetic domain wall pinned by using a pinning site and the wall is hard to move. The pinning site has a size of about several ten angstroms (Å) and exists in plural in a crystal grain. Even if a process stress or other such external stresses are applied thereon to thereby break a part thereof, no influence is exercised on an overall structure.

The coersive force is exerted by fixing the magnetic domain wall in the crystal or crystal boundary. Thus, the Sm—Co magnet can exert the high coersive force by pinning the magnetic domain wall.

Accordingly, even if the stress or other such forces are applied to the Sm—Co magnet, or the temperature is raised, the magnetic domain wall cannot move, resulting in the structure less likely to demagnetize the magnet.

As mentioned above, even when applied with heat or force such as stress after the magnetization, the Sm—Co magnet can keep the magnetic force as compared to the Nd—Fe—B magnet and therefore is more preferable as a raw material for the permanent magnet 3.

Also, an Sm—Co magnetic material has been conventionally known to be superior, but samarium (Sm) costs high and thus cannot be used. However, the permanent magnet 3 has a small inner diameter and small thickness in the radial direction, and thus requires a small amount of samarium to be used. As a result, the permanent magnet 3 can be manufactured at a low cost.

A permanent magnet such as an Nd—Fe—B bonded magnet having used conventionally for a rotor magnet can be reduced in size and thickness.

However, there arise a problem about demagnetization resulting from the reduction in size and thickness of the conventional permanent magnet and a problem about a magnetizing method for realizing the multipolar magnet.

To solve the problems, preferably used as the small-sized permanent magnet is a permanent magnet made of an Sm—Co magnetic material rather than an Ne—Fe—B magnetic material.

FIG. 6 is a table listing combination examples of the number of poles of the permanent magnet 3 enough to constitute the motor 30, the number of slots of the stator, and the number of AC phases for driving the motor 30.

In this embodiment, the motor 30 is configured as an example such that the permanent magnet 3 has 12 poles, the number of slots is 9, and the number of AC phases for driving the motor is 3. As shown in FIG. 6, however, various combinations of the number of poles, the number of slots, and the number of phases are allowed.

A most frequently used one at present has a permanent magnet of 12 poles, 9 slots, and 3 AC phases.

FIG. 7 illustrates a difference in process step between an isotropic magnetic material and anisotropic magnetic material.

Also, FIG. 7 is a schematically diagram illustrating a process step of the magnetic structure of the magnetic material but not necessarily illustrating an actual magnetic physical structure.

Figure 7A:
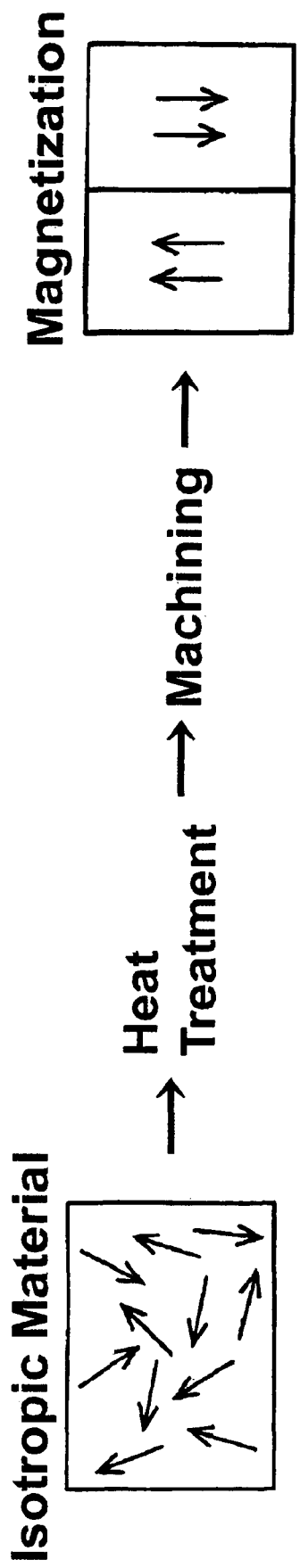
FIGS. 7A-7C illustrate differences between an isotropic magnetic material and an anisotropic magnetic material.

FIG. 7(a) schematically illustrates a process step of an isotropic magnetic material. The Nd—Fe—B magnetic material, which has been widely used so far, is an isotropic magnetic material. The magnetic material includes atoms having magnetic moments. Aligning the magnetic moments in the same direction makes it possible to exert the magnetic force.

The isotropic magnetic material has random magnetic moments in the unmagnetized material, and by magnetizing the material (allowing the magnetic field to act on the material from the outside to thereby align the magnetic moments), a magnet is formed.

The left-hand side of FIG. 7(a) schematically shows the directions in which the magnetic moments act in the unmagnetized material. The directions of the magnetic moments are denoted by the arrows. As shown in the figure, the magnetic moments act at random before the magnetization.

The magnetic material is generally in a powder form; the material is put into a mold and heated to be sintered, or heated together with a resin (bond) and subjected to resin molding or compression molding, thereby molding the magnet.

Next, the unmagnetized molded magnet is machined and shaped into a proper outer size, after which the resultant magnet is magnetized by a magnetizing device.

If machining is carried out after the magnetization, the cut pieces are attracted to the magnet, deteriorating a finished product. Hence, in general, magnetization is carried out after machining.

Figure 7B:
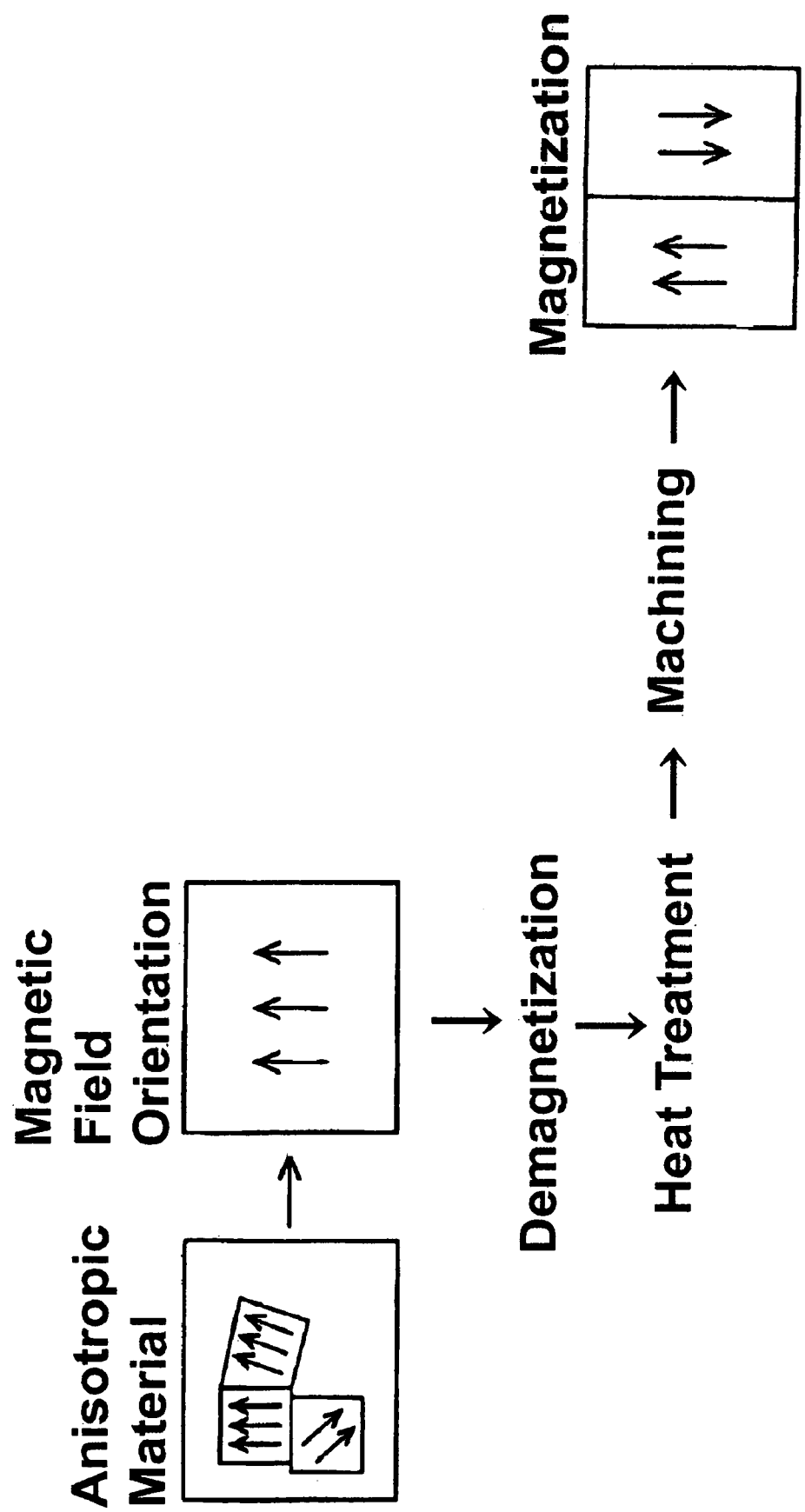

FIG. 7(b) schematically illustrates the anisotropic magnetic material. The Sm—Co based magnetic material used in this embodiment shows the anisotropic property.

The unmagnetized magnetic material having the anisotropic property is constituted of aggregations of regions (constituents) where magnetic moments are aligned in the same direction. In the figure, the three regions where the magnetic moments are aligned in the same direction are schematically shown and other regions are omitted.

The magnetic material having the anisotropic property is known to generate a strong magnetic field when magnetized after the magnetic field orientation.

The term magnetic field orientation means directional alignment of the magnetic moments by previously magnetizing the raw materials in one direction before magnetizing the magnet to obtain the multipolar magnet.

The permanent magnet is manufactured from the magnetic material having the anisotropic property by the following process.

First, the powdery anisotropic magnetic material is put into a predetermined mold (in the case of sintering the same, put into the mold in the powder form or together with a resin upon resin-molding) and roughly shaped. At this point, the material is compressed by applying a pressure of about 7 tons, for example, to the material in the state of being put into the mold and heating the material. The magnetic material can attain higher density through this treatment, so a magnet having a stronger magnetic force can be prepared.

The following process from the heat treatment to solidification is performed with the material put into the mold.

Next, the magnetic field acts on the magnetic material in the state of being put into the mold, in a given direction and the magnetic moments are aligned in the same direction through the magnetic field orientation. At this time, the magnetic material exhibits weak but magnetic property.

Note that the magnetic field orientation is performed on the magnetic material in the powder form in the above process, so the process is called a dry process. The magnetic field orientation includes a wet process where the magnetic field orientation is performed on the powdery magnetic material immersed in a liquid in addition thereto.

Next, an AC magnetic field etc. are applied to the magnetic material having undergone the magnetic field orientation to thereby demagnetize the material. Demagnetization can keep the magnetic material from being magnetized while maintaining the magnetic force direction of the magnetic material. This is because the N pole and the S pole are formed in the same direction before the demagnetization, while after the demagnetization, the N pole and the S pole are arranged at random while maintaining the magnetic force direction.

Subsequently, the material is subjected to heat treatment and resin-molding or sintering to be solidified, offering the unmagnetized permanent magnet.

Following this, the solidified magnetic material is taken out of the mold. Then, the resultant is machined and shaped into a proper outer size, followed by magnetization with a magnetizing device. The unmagnetized permanent magnet shows no magnetic property due to the demagnetization, making it possible to avoid such a trouble that the cut pieces are attracted during the machining.

Figure 7C:
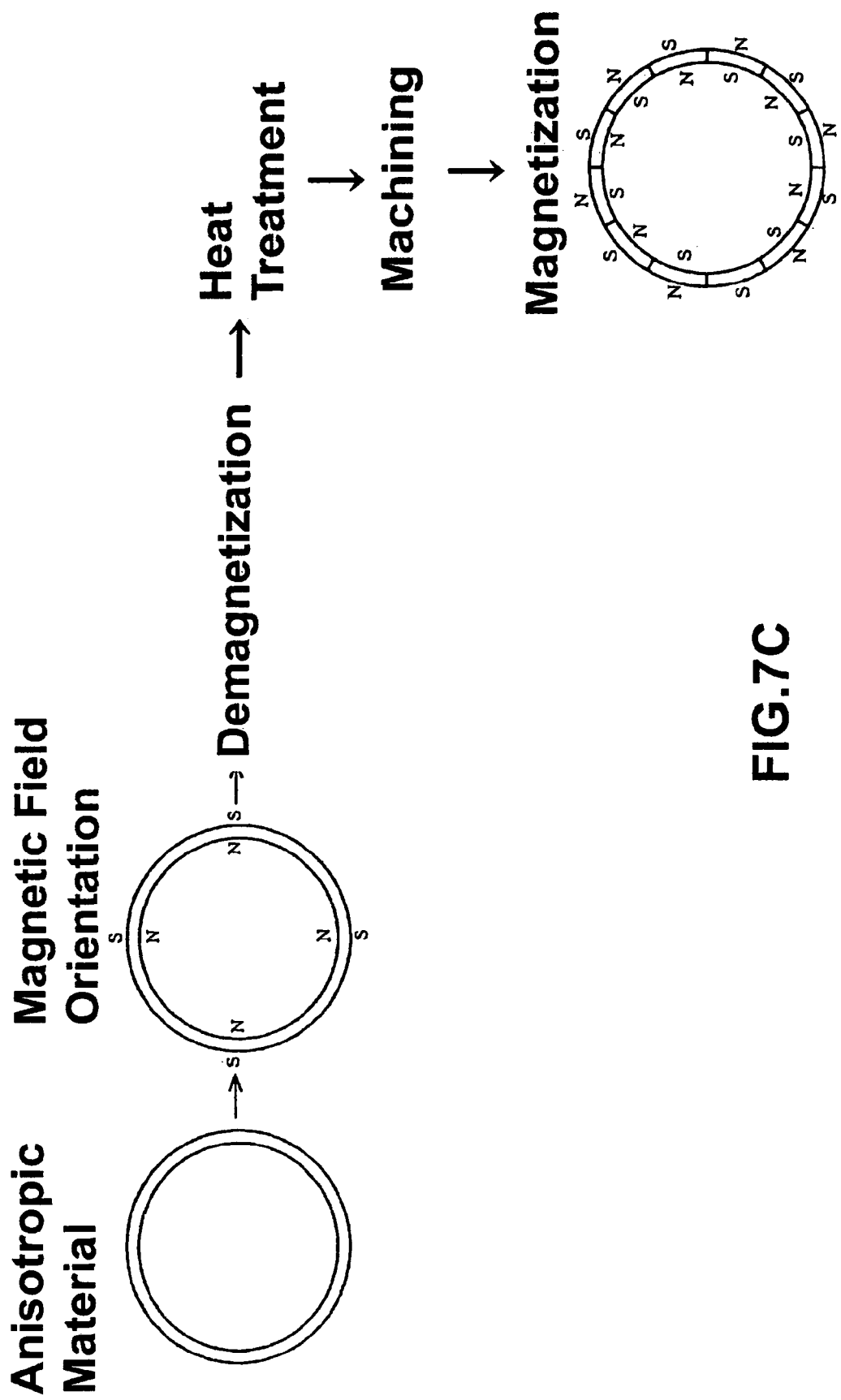

Upon manufacturing the permanent magnet 3, the Sm—Co based magnetic material is put into a mold and roughly shaped as shown on the left-hand side of FIG. 7(c), after which the magnetic field orientation is effected in a given direction such that N poles and S poles are arranged on an inner side and an outer side, respectively, for example.

Next, the material is demagnetized so as not to show the magnetic property and then subjected to heat treatment and resin molding or sintering to thereby mold the material into a ring shape.

Then, the material is machined and shaped into a proper outer size, followed by magnetization by the magnetizing device to have a predetermined number of poles.

Subsequently, an explanation will be given of how to magnetize the permanent magnet 3.

Figure 8:
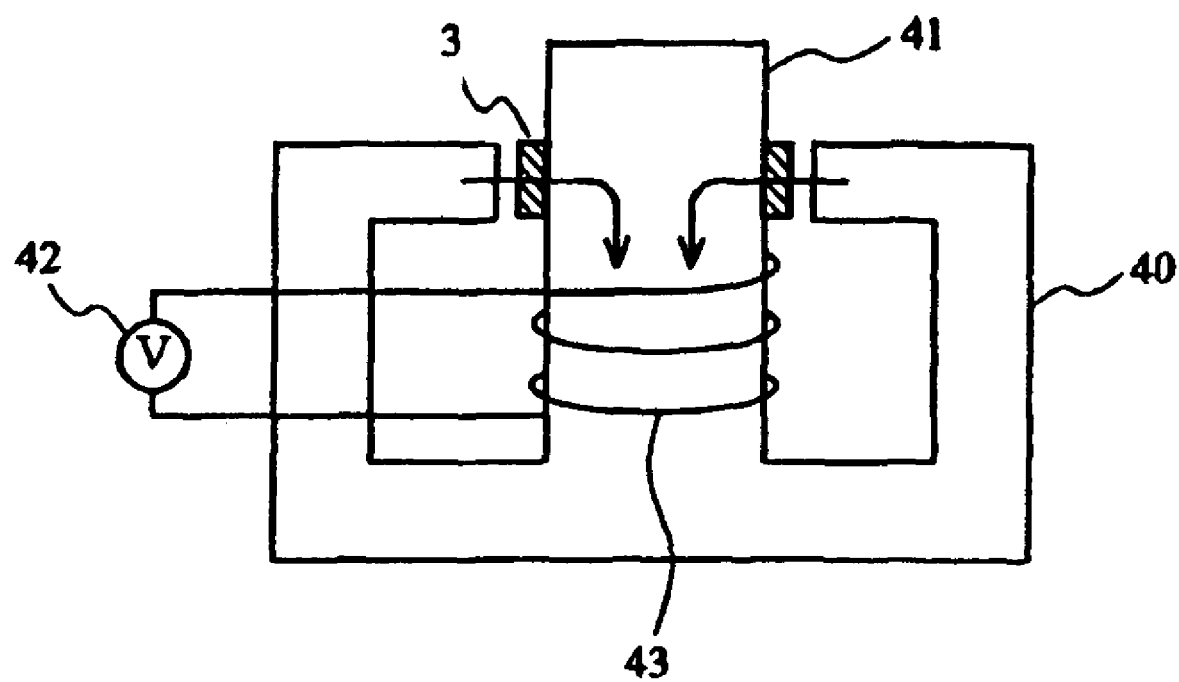
FIG. 8 is a schematic sectional view taken along an axial direction of a magnetic field orientation device and a permanent magnet.

FIG. 8 schematically shows the section of the permanent magnet 3 and the magnetic field orientation device in the axial line direction. The magnetic field orientation device is composed of a cylindrical iron core 41, a magnetic circuit 40, a power supply device 42, and the like.

A gap is defined between the upper periphery of the iron core 41 and the magnetic circuit 40, and the permanent magnet 3 can be inserted into the gap.

A winding 43 is wound around an iron core 41. A large amount of pulsed current can be supplied from the power supply device 42 to the winding 43. If a current is allowed to flow in the winding 43, a magnetic force line develops in the iron core 40 and the magnetic circuit 40. Then, the magnetic field generated in the gap between the magnetic circuit 40 and the iron core 41 serves to magnetize the permanent magnet 3 in one direction.

In this way, the magnetic field orientation device should be downsized along with the reduction in size of the permanent magnet 3. In accordance with this, it is difficult to supply a large amount of current to the winding 43. However, the permanent magnet 3 is not thick on account of being limited in the thickness t and thus can be magnetized up to magnetic saturation or near to magnetic saturation with less current.

Figure 9A:
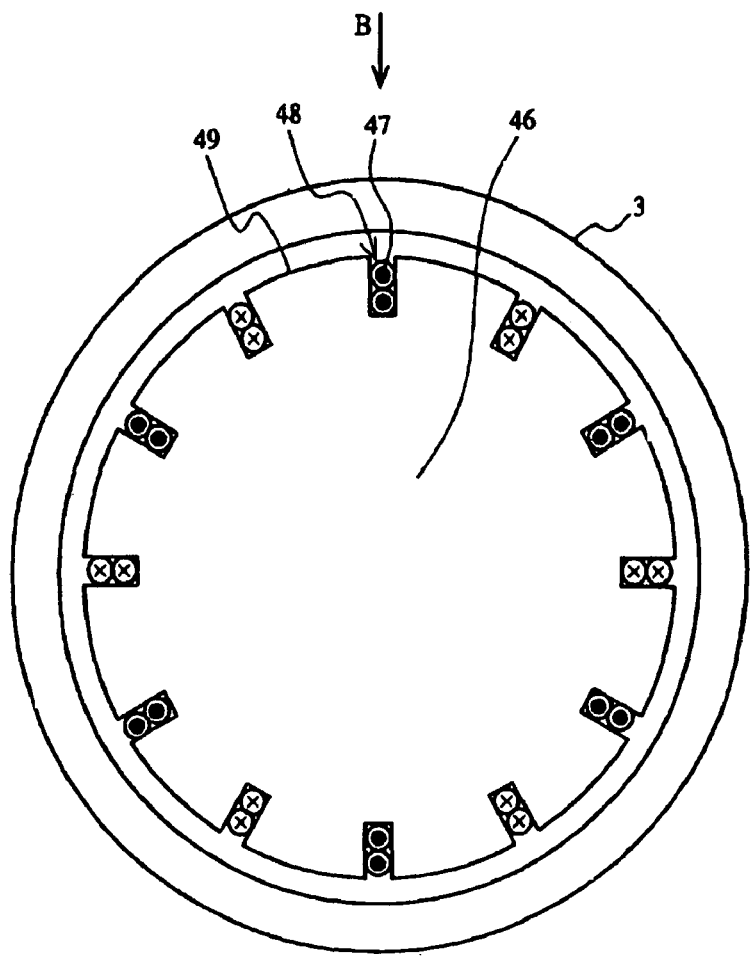
FIGS. 9A-9B are schematic views showing a magnetizing head.

FIG. 9(a) schematically shows the section taken along the axial line direction of the structure of the magnetizing head 46.

The magnetizing head 46 has a cylindrical shape and includes plural slots 48 in the axial line direction on its circumference. Cores 49 are formed at regular intervals in a number corresponding to the number of poles of the permanent magnet 3, which are separated from each other across the slots 48 on the circumference of the magnetizing head 46.

Lead wires 47 are wound in the slots 48. Note that in FIG. 9(a), the lead wire 47 is wound in the slot 48 by two wire turns each, but in general, 1 to 4 wire turns are employed.

Figure 9B:
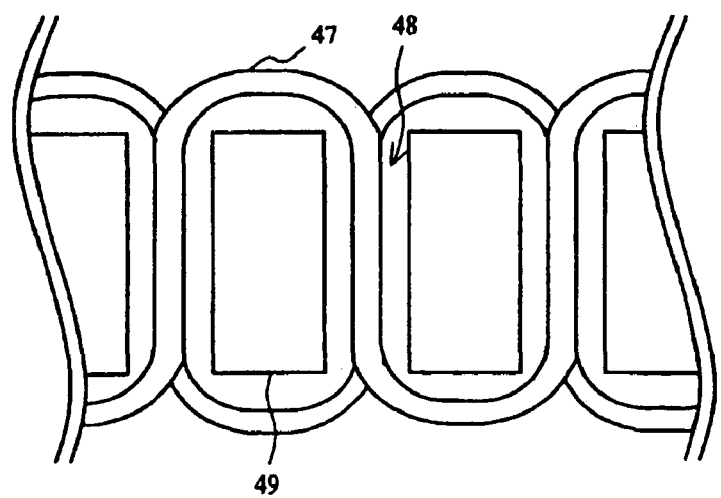

FIG. 9(b) schematically shows the magnetizing head 46 as viewed from the direction of the arrow B of FIG. 9(a).

As shown in the figure, the lead wire 47 is disposed in a meandering form around the core 49.

For that reason, when a DC current is directly supplied to the lead wire 47, the magnetic poles excited by the adjacent core 49 are inversed.

If the permanent magnet 3 having undergone the magnetic field orientation is disposed around the magnetizing head 46 and the DC current is directly supplied to the lead wire 47, the permanent magnet 3 is magnetized to the desired number of poles by the magnetic field generated by the core 49.

The magnetizing head 46 is thus configured. Hence, when the permanent magnet 3 reduces its size and increases the number of poles, the lead wire 47 disposed to the magnetizing head 46 is thinned, making it difficult to allow a large amount of current to flow therein.

However, the thickness t of the permanent magnet 3 of this embodiment is limited within a predetermined range. The permanent magnet 3 can be magnetized up to magnetic saturation or near to magnetic saturation with less current. Also, the use of the Sm—Co based magnetic material enables the permanent magnet 3 to stably generate the magnetic force sufficiently even if the thickness t falls within the range defined by the expression (3).

Figure 10:
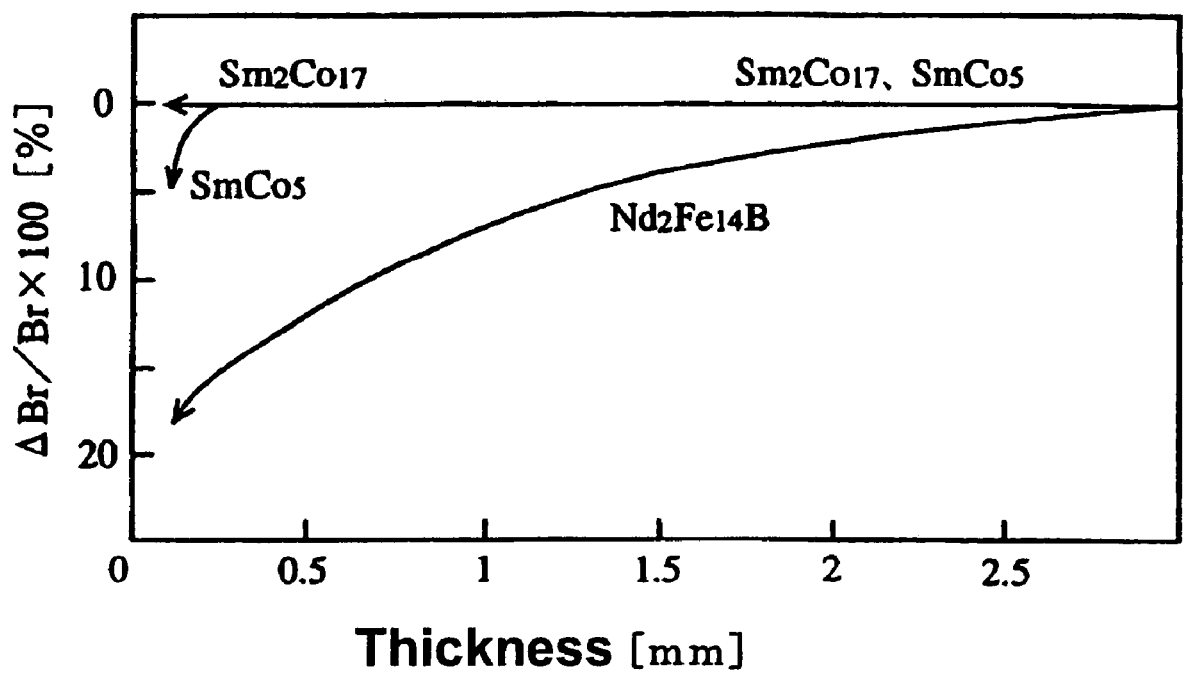
FIG. 10 is a graph illustrative of estimated results of a reduction in residual flux density due to processing of a permanent magnet.

FIG. 10 is a graph illustrative of estimated results of a reduction in magnetic characteristic (characteristic regarding residual flux density) due to processing of the permanent magnet for a motor made of Nd2Fe14B as an Nd—Fe—B based magnetic material and Sm2Co17 and SmCo5 as an Sm—Co based magnetic material, by various experiments.

Note that Sm2Co17 is an anisotropic magnetic material and SmCo5 is an isotropic magnetic material.

FIG. 10 is a graph in which a horizontal axis represents a thickness in a radial direction of the permanent magnet and a vertical axis represents a decreasing rate of the residual flux density in %.

As shown in the figure, in the case of the thickness not smaller than about 2 (mm), there is no particular difference between the permanent magnet made of Nd2Fe14B and the permanent magnet made of Sm2Co17 or SmCo5.

However, in the case of the thickness of 2 (mm) or smaller, the permanent magnet made of Nd2Fe14B abruptly decreases the residual flux density; the residual flux density is decreased by about 10% with the thickness of about 1 (mm).

On the other hand, even when the permanent magnet made of Sm2Co17 or SmCo5 is thinned, almost no reduction is caused in the residual flux density. In a region where the thickness is 0.5 (mm) or smaller, it is presumed that the permanent magnet formed of SmCo5 as an isotropic magnetic material decreases its residual flux density, while the permanent magnet formed of Sm2Co17 as the anisotropic magnetic material does not reduce its residual flux density.

From these estimated results, in the region where the thickness is 2 (mm) or smaller, the permanent magnet made of an Sm—Co based magnetic material is superior to the permanent magnet made of an Ne—Fe—B based magnetic material in residual flux density. In particular, the permanent magnet made of an anisotropic Sm—Co based magnetic material is estimated to excel in characteristic.

Figure 11:
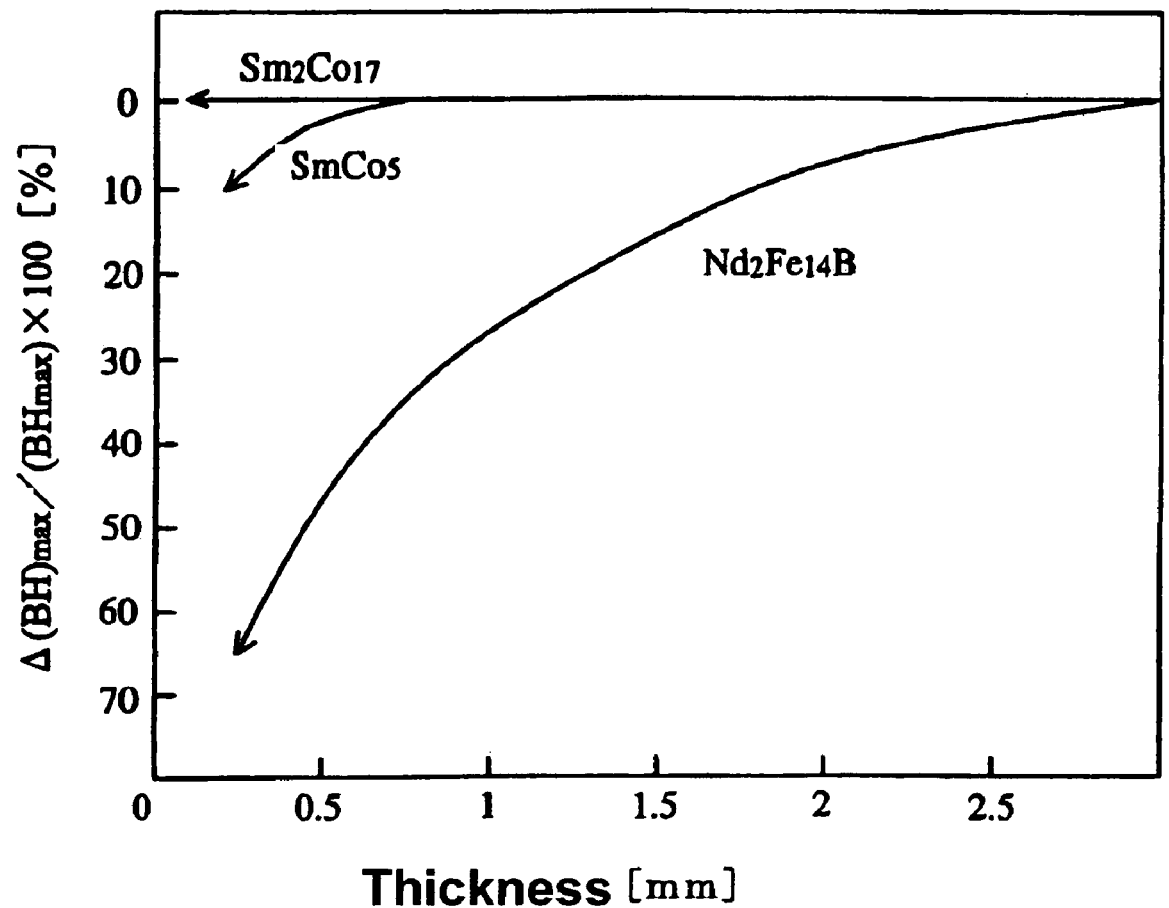
FIG. 11 is a graph illustrative of estimated results of a reduction in the energy product due to the processing of the permanent magnet.

FIG. 11 is a graph illustrative of estimated results of a reduction in magnetic characteristic (maximum energy product) due to processing of the permanent magnet for a motor made of Nd2Fe14B as an Nd—Fe—B based magnetic material and Sm2Co17 and SmCo5 as an Sm—Co based magnetic material, by various experiments.

FIG. 11 is a graph in which a horizontal axis represents a thickness in a radial direction of the permanent magnet and a vertical axis represents a decreasing rate of the energy product in %.

As shown in the figure, in the case of the thickness not smaller than about 2 (mm), there is no particular difference between the permanent magnet made of Nd2Fe14B and the permanent magnet made of Sm2Co17 or SmCo5.

However, in the case of the thickness of 2 (mm) or smaller, the permanent magnet made of Nd2Fe14B abruptly decreases the energy product; the energy product is decreased by about 30% with the thickness of about 1 (mm).

On the other hand, even when the permanent magnet made of Sm2Co17 or SmCo5 is thinned, almost no reduction is caused in the energy product. In a region where the thickness is 0.5 (mm) or smaller, it is presumed that the permanent magnet formed of SmCo5 as an isotropic magnetic material decreases its energy product, while the permanent magnet formed of Sm2Co17 as the anisotropic magnetic material does not reduce its energy product.

From these estimated results, in the region where the thickness is 2 (mm) or smaller, the permanent magnet made of an Sm—Co based magnetic material is superior to the permanent magnet made of an Ne—Fe—B based magnetic material in energy product. In particular, the permanent magnet made of an anisotropic Sm—Co based magnetic material is estimated to excel in characteristic.

When manufacturing a permanent magnet for a motor, in general, the magnetic material is magnetized to obtain a permanent magnet, followed by polishing or cutting process to shape the permanent magnet into a proper outer size. As understood from the above considerations, in this case, using the Sm—Co based permanent magnet, in particular, the anisotropic Sm—Co based permanent magnet is more preferable than using the Ne—Fe—B based permanent magnet in the region where the permanent magnet has a thickness of 2 (mm) or smaller.

Figure 12:
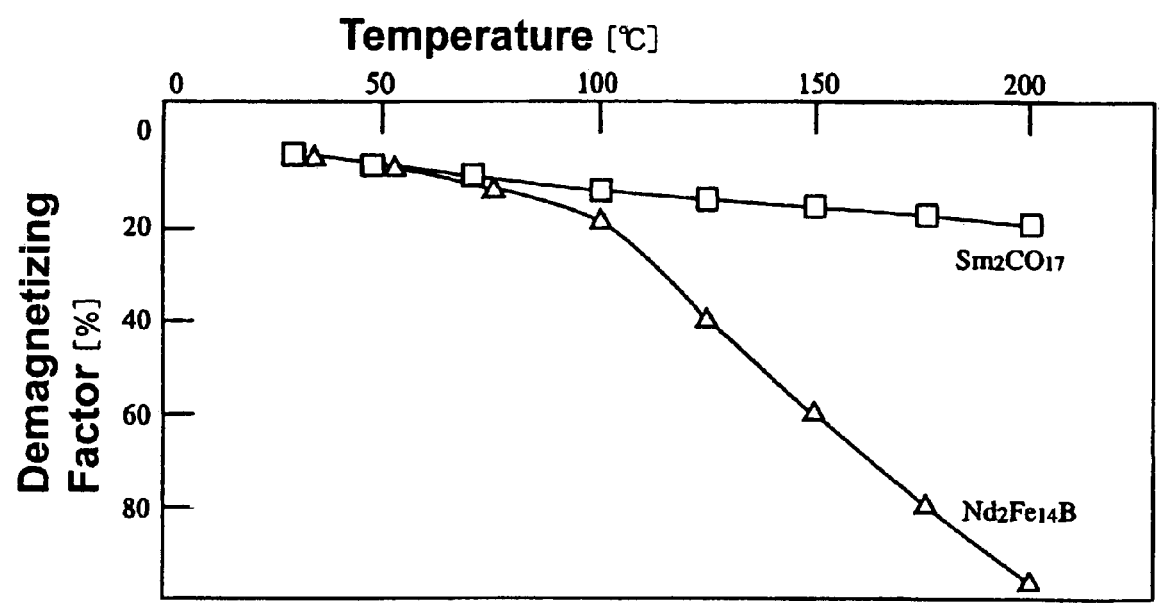
FIG. 12 is a graph plotting demagnetizing factors based on temperature of the permanent magnet.

FIG. 12 is a graph plotting demagnetizing factors of the permanent magnet made of Nd2Fe14B and the permanent magnet made of Sm2Co17 based on temperature.

As apparent from FIG. 12, the demagnetizing factor is about several % up to about 100 (° C.) in both the permanent magnets. However, in a region where the temperature is equal to or higher than 100 (° C.), the permanent magnet made of Nd2Fe14B abruptly increases its demagnetizing factor and is demagnetized by 80% or more at around 200 (° C.). On the other hand, the demagnetizing factor of the permanent magnet made of Sm2Co17 is kept at about 20% even at around 200 (° C.).

As mentioned above, the Sm—Co based permanent magnet is expected to involve a smaller change in magnetic characteristic due to heat than the Nd—Fe—B based permanent magnet.

The explanation has been made so far with reference to FIGS. 10 to 12 by using Nd2Fe14B as the magnetic material. However, similar results can be obtained by using a magnetic material similar thereto, such as (NdDy)2Fe14B.

This embodiment as described above can provide (1) a permanent magnet for a motor, (2) a motor, and (3) a magnetizing method as described below.

(1) It is possible to provide a permanent magnet for a motor disposed in a rotor of the motor, including domains that are magnetized in a radial direction after magnetic field orientation, have aligned magnetizing directions, and are arranged at regular intervals in a circumferential direction, characterized in that the permanent magnet is formed of an anisotropic Sm—Co based magnetic material having a cylindrical shape with an outer diameter of 20 (mm) or smaller.

Also, it is possible to provide a permanent magnet for a motor, which is disposed in a rotor of the motor, has a cylindrical shape, and is made of an anisotropic Sm—Co based magnetic material, including domains that are magnetized in a radial direction after magnetic field orientation, have aligned magnetizing directions, and are arranged at regular intervals in a circumferential direction, characterized in that provided that D represents an inner diameter of the permanent magnet for the motor, t represents a thickness in the radial direction, N represents the number of domains, and M represents the number of AC phases for driving the motor, D is set to 20 (mm) or smaller and t is set to satisfy the relation of $t \leq \pi D/(NM-\pi)$.

(2) It is possible to provide a motor, including: a rotor portion including a rotational symmetrical body around which a cylindrical permanent magnet is arranged and a rotational shaft arranged on an axial line of the rotational symmetrical body; a stator portion having a plurality of stator coils excitable with AC having M phases, which are each arranged on an inner circumference of the permanent magnet to face the permanent magnet; and a bearing portion rotatably and pivotally supporting the rotational shaft to the stator portion so that the rotational symmetric body and the stator coil are concentric to each other, characterized in that: the permanent magnet is made of an anisotropic Sm—Co based magnetic material having a cylindrical shape with an outer diameter of 20 (mm) or smaller and includes domains that are magnetized in a radial direction after magnetic field orientation, have aligned magnetizing directions, and are arranged at regular intervals in a circumferential direction.

(3) A method of manufacturing a permanent magnet for a motor using an anisotropic Sm—Co based magnetic material having a cylindrical shape with an outer diameter of 20 (mm) or smaller, characterized by including a molding step of charging the magnetic material into a mold to mold the magnetic material; a magnetic field orientation step of performing magnetic field orientation on the molded magnetic material; a demagnetizing step of demagnetizing the magnetic material having undergone the magnetic field orientation; a heat treatment step of subjecting the demagnetized magnetic material to heat treatment to solidify the magnetic material; a machining step of machining the heat-treated magnetic material into a cylindrical shape with an outer diameter of 20 (mm) or smaller; and a magnetizing step of magnetizing the machined magnetic material to have a predetermined number of poles in a radial direction so that domains having aligned magnetizing directions are arranged at regular intervals in a circumferential direction.

Also, the molding step of charging the magnetic material into a mold to mold the material may include: a compression step of charging the Sm—Co based magnetic material into a mold and compressing the material; and a heating step of heating the compressed magnetic material in a state of being charged into the mold.

INDUSTRIAL APPLICABILITY

The aforementioned embodiment of the present invention can produce the following effects.

(1) The Sm—Co based magnetic material is used, whereby a motor characteristic stable against a change over time and temperature change.

(2) The magnet is made multipolar, whereby it is possible to reduce magnetic vibrations (pure tone), which are of particular note in the dynamic motor.

(3) Based on the expression (3), the multipolar motor magnetic circuit can be designed.

(4) The magnetizing current is allowed to flow in the magnetizing head in a reasonable range of current amount, whereby a jig for the magnetizing head elongates its service life, resulting in a stable quality after magnetizing the magnet.

(5) The magnet is made multipolar, whereby cogging is reduced.

The above description is centered on one embodiment of the present invention. However, the present invention is not limited to the above-mentioned embodiment but allows various modifications within the scope of appended claims.

For example, the aforementioned motor 30 is of the outer rotor type where the rotor portion is positioned outwardly from the stator portion. However, this is not intended to limit the type of motors to the outer rotor type and an inner rotor type motor can be used.

In the case of using the inner rotor type motor, the stator portion is positioned on an outer circumference of the rotor portion having the permanent magnet fixed thereto, with the result that the plural stator coils are arranged at regular intervals to surround the permanent magnet.

According to the present invention, the compact, higher-performance motor can be provided.

The invention claimed is:

1. A method for magnetizing a permanent magnet for a motor, comprising the steps of:
    providing a permanent magnet having a thickness t in a radial direction of the permanent magnet satisfying the relation of $t \leq \pi D/(NM - \pi)$, where D represents an inner diameter of the permanent magnet having a value of 20 mm or less, N represents the number of the magnetic domains of the permanent magnet, and M represents the number of alternating current phases for driving the motor;
    a first magnetizing step of magnetizing the permanent magnet in one direction corresponding to the radial direction; and
    a second magnetizing step of magnetizing the permanent magnet magnetized in the first magnetizing step to form inverse magnetic domains that are arranged at regular intervals in the radial direction and that reverse magnetizing of the one direction of the permanent magnet.

2. A method according to claim 1; wherein the permanent magnet is generally cylindrical-shaped.

3. A method according to claim 1; wherein the second magnetizing step includes the step of forming the magnetic domains of the permanent magnet with aligned magnetizing directions.

4. A method according to claim 1; wherein the permanent magnet is formed of an Sm—Co based magnetic material.

5. A method according to claim 1; wherein the motor comprises an outer-rotor type motor.

6. A method according to claim 1; wherein the motor comprises an inner-rotor type motor.

* * * * *